United States Patent [19]
Eriksson

[11] Patent Number: 5,189,637
[45] Date of Patent: Feb. 23, 1993

[54] METHOD AND APPARATUS FOR PREVENTING ERRONEOUS ECHOELIMINATION AND EQUALIZATION

[75] Inventor: Erik A. Eriksson, Bandhagen, Sweden

[73] Assignee: Telefonaktiebolaget L M Ericsson, Stockholm, Sweden

[21] Appl. No.: 498,755

[22] Filed: Mar. 26, 1990

[30] Foreign Application Priority Data

Apr. 27, 1989 [SE] Sweden ............................ 89015424

[51] Int. Cl.$^5$ ........................... G06G 7/02; H04J 1/00
[52] U.S. Cl. ..................................... 364/825; 370/32.1
[58] Field of Search .................. 364/825; 370/32, 32.1; 340/347 CC, 347 AD, 342 DA, 342 L; 341/108, 144, 165, 150; 379/410, 411

[56]  References Cited

U.S. PATENT DOCUMENTS

| | | | |
|---|---|---|---|
| 4,129,863 | 12/1978 | Gray et al. | 340/347 AD |
| 4,200,863 | 4/1980 | Hodges et al. | 340/347 AD |
| 4,476,456 | 10/1984 | Domogalla | 340/347 AD |
| 4,669,116 | 5/1987 | Agazzi et al. | |
| 4,746,902 | 5/1988 | Tol et al. | 340/347 LL |
| 4,872,011 | 10/1989 | Pelgrom et al. | 341/150 |
| 4,977,591 | 12/1990 | Chen et al. | 379/410 |
| 4,999,830 | 1/1991 | Agazzi | 370/32.1 |
| 5,001,480 | 3/1991 | Ferry et al. | 341/108 |

FOREIGN PATENT DOCUMENTS 0240055 10/1987 European Pat. Off. .

Primary Examiner—Jerry Smith
Assistant Examiner—Jim Trammell
Attorney, Agent, or Firm—Burns, Doane, Swecker & Mathis

[57] ABSTRACT

In a telecommunication system, erroneous echo-elimination and equalization resulting from non-linearities of a D/A-converter and an A/D-converter are prevented. An error signal ($e_n$) updates an adaptive echo-elimination filter and an adaptive equalization filter. The error signal ($e_n$) also adjusts the values of specific adjustable devices, such as capacitors, in the converters to compensate for non-linearities in the converters. The error signal is used by logic devices to adjust the converters in accordance with various algorithms.

14 Claims, 2 Drawing Sheets

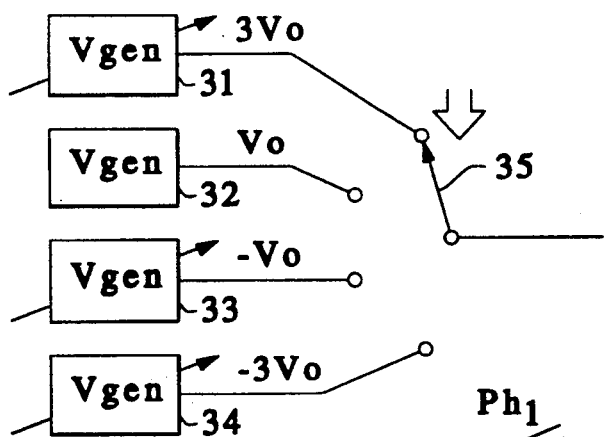
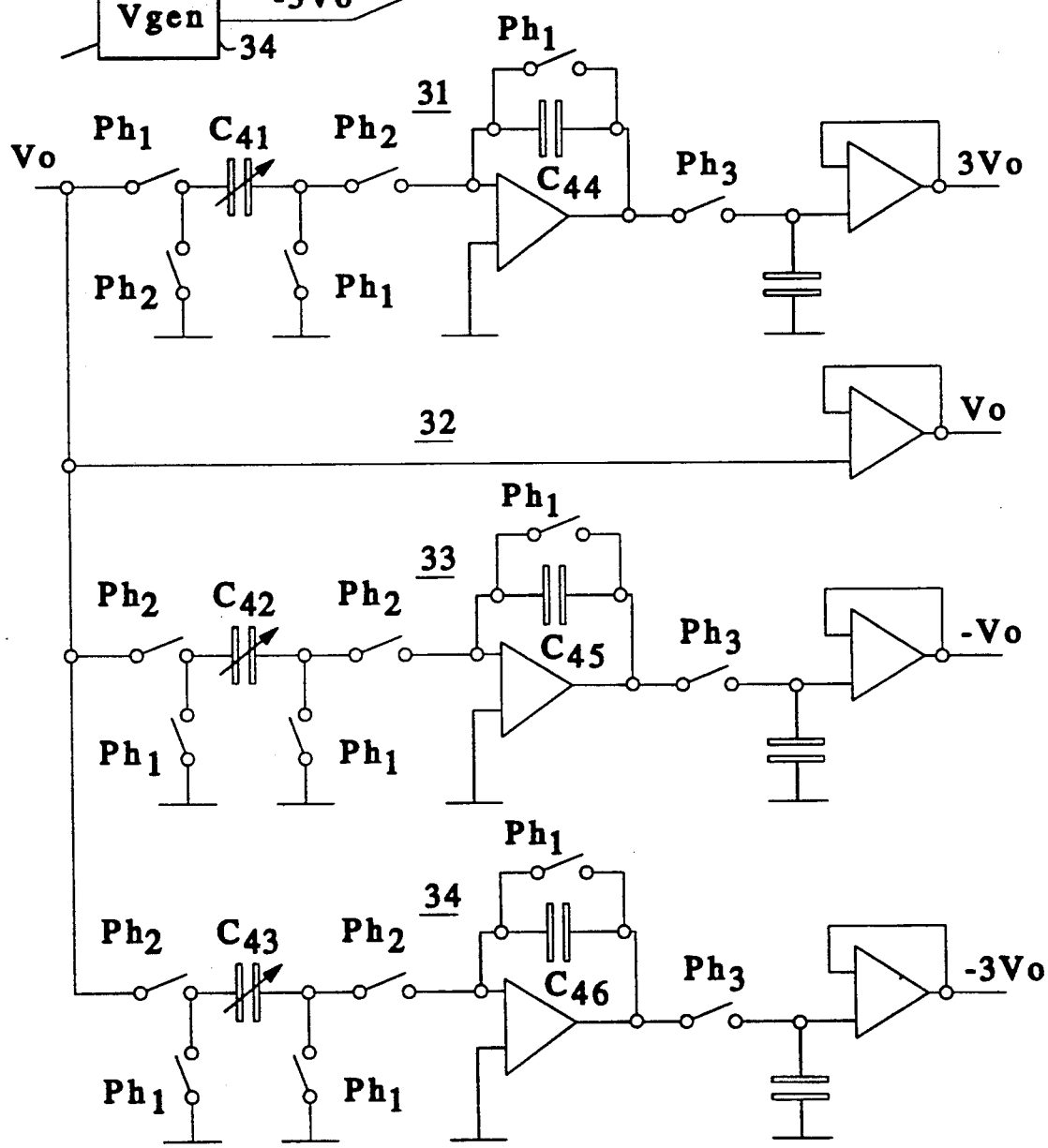
Fig. 3
Fig. 4

METHOD AND APPARATUS FOR PREVENTING ERRONEOUS ECHOELIMINATION AND EQUALIZATION

FIELD OF THE INVENTION

The present invention relates to a method and an arrangement for avoiding erroneous echo-elimination and/or equalization resulting from non-linearities in a D/A-converter and/or an A/D-converter in a telecommunication system. An error signal is formed for the purpose of updating a filter for adaptive echoelimination and/or a filter for adaptive equalization.

BACKGROUND OF THE INVENTION

Digital transversal filters of the "tapped delay line" kind are used to form linear combinations of a given number of incoming digital values. Such filters are only able to achieve effective echoelimination and/or equalization in telecommunication systems when the signal paths in which the filters are located contain no non-linear devices. An echoelimination filter is normally coupled between a transmitting branch and a receiving branch which are connected to a 2-to 4-wire junction. An equalization filter is normally coupled in the receiver branch. The transmission branch includes a D/A converter, whereas the receiver branch includes an A/D-converter. It has been found that the D/A and A/D converters are the major sources of non-linearity in conjunction with echo-elimination and equalization.

According to one known method, see for instance EP, A1, 0.240.055, non-linearities are compensated with the aid of a separate correction device connected downstream of an A/D-converter in a receiver branch. This device generates correction values which are added to the converter output values. Another possibility of avoiding problems caused by non-linear converters is the use of table filters instead of transversal filters. Table filters eliminate echo and achieve equalization despite non-linearities. Both methods, however, require relatively complicated and bulky equipment.

An A/D-converter which operates with successive approximations normally includes a D/A-converter having a plurality of binary-weighted devices, for instance capacitors or current sources. Non-linearities occur in converters of this kind because the binary-weighted devices are, in practice, not binary-weighted to sufficient accuracy. One method of improving linearity is to adjust the values of the weighted devices more accurately during manufacture, e.g. by cutting away parts of the capacitors using a laser. This method, however, is expensive. Furthermore, the component values change with time in depending on temperature, etc., and consequently no durable linearity can be achieved.

An A/D-converter which operates with successive approximations can also be self-calibrating, meaning that the values of the binary-weighted devices are monitored and corrected at regular intervals, e.g. after each conversion cycle. Correction, for instance, of the capacitance values is effected by activating or deactivating small parallel-connected capacitors in order to respectively increase and decrease the capacitance. This also requires the provision of additional logic devices for carrying out requisite calibration cycles and for producing correction signals. At the same time, the conversion capacity is reduced resulting from carrying out the calibration cycles. Selfcalibration is known from, for instance, the article "Self-calibration and oversampling make room for more digital circuitry on monolithic ADCs", EDN, Oct. 15, 1987.

SUMMARY OF INVENTION

The object of the invention is to provide a method which will avoid erroneous echo-elimination and/or equalization resulting from non-linearities caused by D/A and A/D converters. The method is simple and functions does without requiring complicated or bulky equipment and does not reduce the capacity of the converters. An error signal is generated to update adaptive filters and to adjust the values of particular components in the converters in order to avoid non-linearities. In practice, the adjustment signals are generated using suitable algorithms.

BRIEF DESCRIPTION OF THE DRAWINGS

FIG. 3 is a block schematic illustrating part of a D/A-converter incorporated in the transmission branch illustrated in FIG. 1; and FIG. 4 illustrates in more detail an embodiment of the block illustrated in FIG. 3.

DETAILED DESCRIPTION OF THE PREFERRED EMBODIMENTS

Figure 1:
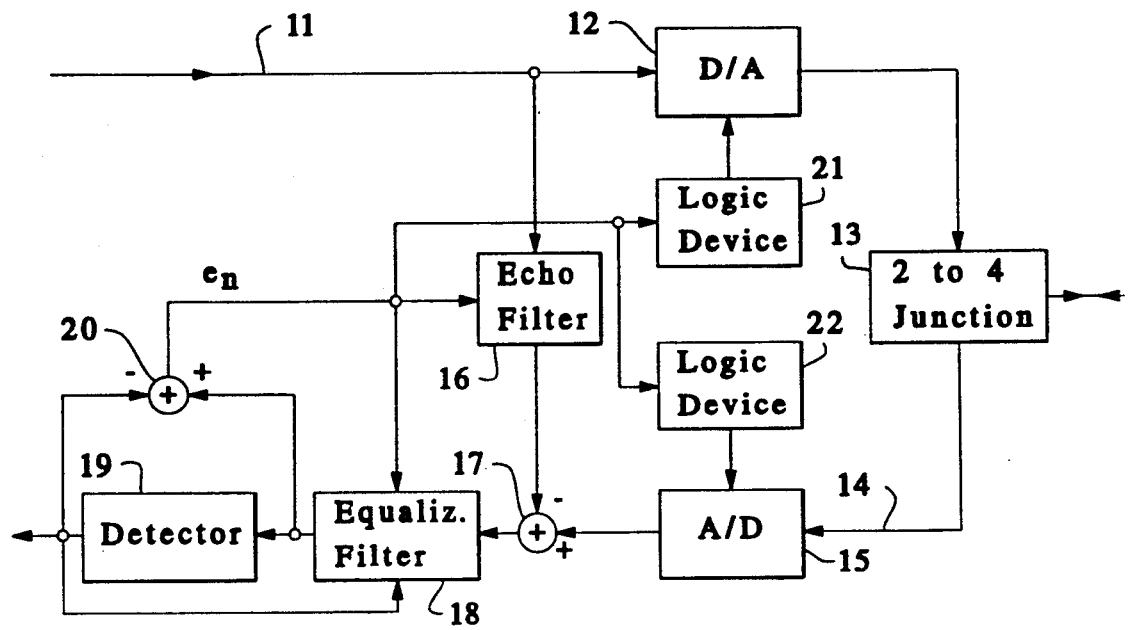
FIG. 1 illustrates parts of a transmission branch and a receiver branch in a 2- to 4-wire junction in a telecommunication system.

FIG. 1 illustrates part of a telecommunication system. Transmission branch delivers digital data signals to the system. These signals are applied to a D/A-converter 12 for conversion to analog form. A 2- to 4-wire junction 13. is connected to the transmission branch 11 and a receiver branch 14 which incorporates an A/D-converter 15. The transmission branch may also include a transmission filter (not shown), and the receiver branch may also include a receiver filter and an automatic level-control device (not shown) a filter 16 for adaptive echo-elimination, receives input signals said filter being connected to the transmission branch 11 and the output of said filter being connected to a subtraction device 17 in the receiver branch 14. The difference signal formed in the subtraction device 17 is applied to an adaptive equalization filter 18, the output of which is connected to a detector 19 operative to detect received signals. An error signal $e_n$ for updating the filters 16 and 18 is formed in a subtraction device 20 in a known manner. Other methods, however, are known for forming error signals for the purpose of updating of echo- and equalizing-filters.

That part of the system described hitherto forms part of the known technique. In accordance with the invention, however, the error signal $e_n$ is also used to adjust the D/A-converter 12 and the A/D-converter 15. To this end, two logic devices 21 and 22 are included, these devices forming converter control signals in accordance with appropriate algorithms, as described in more detail hereinafter.

Adaptive equalization filters can also be used at locations other than at a 2- to 4-wire junction. Consequently, application of the invention is not limited to such junctions.

Figure 2:
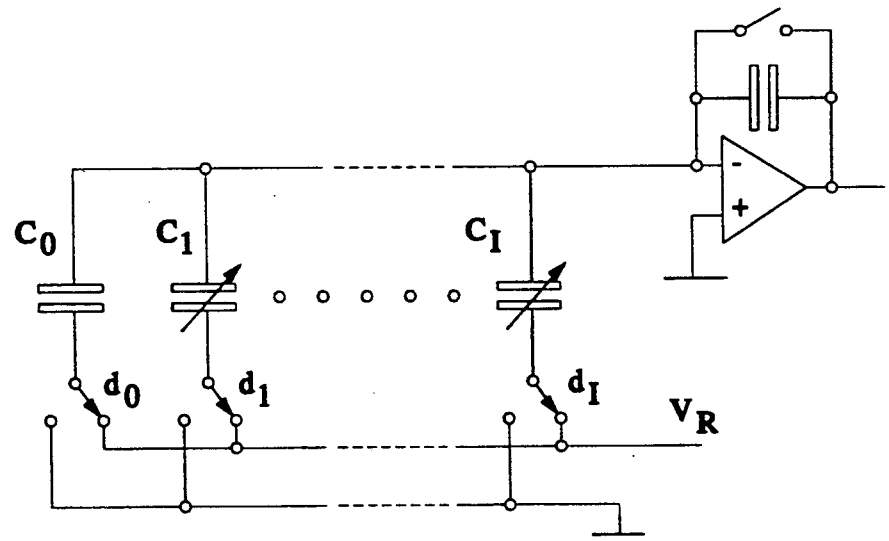
FIG. 2 illustrates an example of a part of an A/D-converter incorporated in the receiver branch illustrated in FIG. 1.

FIG. 2 illustrates an example of a D/A-converter included in the A/D-converter 15 of the FIG. 1 embodiment. In accordance with this example, the A/D-converter is intended to operate in accordance with the principle of successive approximations and includes a D/A-converter having a plurality of mutually binary-weighted capacitors $C_O$-$C_I$. When the capacitance values of the capacitors are designated in the same way as the capacitors, the capacitance $C_i$ of a capacitor with an index i is ideally equal to $C_O/2^i$. The capacitances of the capacitors $C_I$-$C_I$ are variable, however, which enables these capacitances to be corrected when the capacitors $C_O$-$C_I$ are not binary-weighted accurately. The capacitors are connected to a reference volta $V_R$ or to ground, via a respective controllable switch, in a known manner. Control signals designated $d_O$-$d_I$ are applied to the switches. Each of these control signals is either a "one" or a "zero". Instead of correcting the variable capacitances during separate calibration cycles and with the use of separate calibration devices, as in self-calibrating converters in accordance with the aforegoing, the error signal $e_n$ formed for the purpose of updating the echo- and equalizing filter is also used, in accordance with and adjusts the variable capacitance values. The capacitance values can be adjusted at a sampling time-point n in accordance, for instance, with the following algorithm:

$$C_{i,n+1} = C_{i,n} + sign\ (e_n) \cdot sign\ (AD_n) \cdot d_{i,n} \cdot dC.$$

where
$C_{i,n}$ is the capacitance of the capacitor $C_i$ at the sampling time-point n, $AD_n$ is the starting signal at the sampling time-point n from the A/D-converter in which the D/A-converter shown in FIG. 2 is included;

$d_{i,n}$ is the control value, i.e. a "one" or a "zero", which controls the switch at the capacitor $C_i$ at the sampling time-point n; and dC is the incremental value with which the capacitance can be changed.

Depending on whether $d_{i,n}$ is a "one" or a "zero", the new value $C_{i,n+1}$ will either be $C_{i,n} \pm dC$ or remain unchanged and be equal to $C_{i,n}$, in accordance with the algorithm. In this case, it is assumed that the control value $d_{i,n}$ is zero when the capacitor $C_i$ is connected to earth, i.e. when this capacitor does not contribute to the output value of the converter. Thus, only the capacitance values of those capacitors which are active at that time are adjusted.

The algorithm for implementing the aforegoing can be explained by the fact that an error signal $e_n$ having a positive expected value can be formed in two different instances:

1) The output signal from the A/D-converter 15 is positive and greater than would have been the case if the converter had been linear. Situation occurs when the capacitance values are excessively small. The average result achieved by the adjustment is an increase in the capacitance value of the capacitor $C_i$, since both the expected value of the error signal and the output signal of the A/D-converter are positive.

2) The output signal from the A/D-converter is negative and has an absolute value which is smaller than would otherwise have been the case if the converter had been linear. This occurs when the capacitance values are excessively large, and the average result achieved by the adjustment is a decrease in the capacitance value of the capacitor $C_i$, since the expected value of the error signal is positive and the output signal of the A/D-converter is negative.

An error signal $e_n$ having negative expected values is formed in the following two instances:

1) The output signal from the A/D-converter is positive and smaller than it would have otherwise been if the converter had been linear. This occurs when the capacitance values are excessively large.

2) The output signal from the A/D-converter is negative and has an absolute value which is larger than it would otherwise have been if the converter had been linear. This occurs when the capacitance values are excessively small.

The capacitor $C_O$ is used as a reference and is thus not adjustable, since although the capacitors $C_O$-$C_I$ could otherwise be controlled so as to be binary-weighted accurately, all have excessively high or excessively low capacitance values, which would cause the converter to give erroneous output values.

The adjustable capacitors may, for instance, each consist of an appropriate number of small capacitors, each having the capacitance dC in accordance with the above. The adjustable capacitors may also, for instance, consist of a respective large capacitor together with an appropriate number of small capacitors intended for adjusting capacitance.

The D/A-converter incorporated in the A/D-converter 15 need not be composed of binary-weighted capacitors. These capacitors can be replaced, in a known manner, by binary-weighted current sources which, with the aid of switches, contribute or do not contribute to a summation current.

In order to enable the values of the adjustable devices to be adjusted, it is necessary to compile separate adjustment signals in accordance with the illustrated algorithm. The signals can be compiled by a simple logic block, since the signals need only disclose whether the value concerned shall be increased, decreased or left unchanged.

Naturally, the use of algorithms other than the illustrated algorithm is conceivable. For instance, it is possible to use the value of the error signal $e_n$ instead of solely the sign of said error signal. The construction of the logic block required to form the control signals, however, will be slightly more complicated than the case when solely the sign of the error signal is used, since it is then necessary for the control signal to state the magnitude of the change instead of solely plus, minus or zero.

FIG. 3 illustrates an example of a block schematic which illustrates part of the D/A-converter 12 in FIG. 1. The illustrated, exemplifying converter is constructed for four output levels and includes four voltage generating blocks 31-34 and a switch 35. The switch 35 is controlled by an incoming digital signal, symbolically marked with an arrow. Depending on the value of the digital signal, the switch 35 connects one of the voltagegenerating blocks to the converter output. The blocks 31-34 are intended to generate the voltages $3V_O$, $V_O$, $-V_O$ and $-3V_O$, respectively. The voltages generated by the blocks 31, 33 and 34 can be adjusted to correct for deviations from their ideal values in relation to the reference voltage-generated by the block 32.

The voltages from the branches 31, 33 and 34 can be adjusted, for instance, in accordance with the following two-stage algorithm:

$$V_{s,n+\frac{1}{2}} = V_{s,n} - sign\ (e_n) \cdot dV$$

$$V_{i,n+1} = V_{i,n} - sign\ (V_{s,n+\frac{1}{2}} + \Sigma V_{i,n} + V_0) \cdot dV.$$

where s designates which of the blocks 31, 33 and 34 formed the output voltage of the converter at the sampling time-point n, $V_{s,n}$ is the voltage from the block s at the sampling time-point n, i designates a block selected from said blocks having an adjustable voltage, $e_n$ is the error signal, in accordance with the aforegoing, $V_O$ is the fixed reference voltage, and dV is the incremental magnitude for a voltage change.

An excessively large output voltage from the converter will result in a positive error signal $e_n$, and vice versa. It will be evident from the algorithm, for instance, that the voltage value decreases when the error signal is positive. In the first stage, i.e. between the sampling time-point n and n+½, a new voltage value is applied to the block which formed the output voltage of the converter at the sampling time-point n. In the second stage, between the time points n+½ and n+1, new voltage values are determined for all adjustable voltage blocks and for the block which formed the output voltage of the converter at the sampling time-point n and which is assigned a new value at time point n+½. The expression contained in parenthesis in the second stage in the algorithm constitutes the sum of the voltage values from all blocks. This sum is ideally equal to zero. When only the first stage of the algorithm is used, the error signal converges towards a local minimum rather than a global minimum.

FIG. 4 illustrates a more detailed embodiment of the blocks illustrated in FIG. 3. Each of the blocks 31-34 corresponds to one of four branches 31-34 in FIG. 4, each branch producing some external value of voltage $V_O$. Only a buffer amplifier is included in the branch 32 to generate the voltage $V_O$. The voltages $3V_O$, $-V_O$ and $-3V_O$ are generated in the branches 31, 33 and 34 in a known manner with the aid of switched capacitances. These branches incorporate, a plurality of switches referenced $Ph_1$-$Ph_3$. During each conversion phase, switches designated $Ph_1$ are closed during a first time interval, switches designated $Ph_2$ are closed during a second time interval, etc. Each of the branches 31, 33 and 34 include a variable capacitor designated $C_{41}$-$C_{43}$, and an integrator having a fixed integration capacitor designated $C_{44}$-$C_{46}$. The output voltage from each branch is proportional to the quotient of the capacitances of the variable capacitor and the integration capacitor, e.g. $C_{41}/C_{44}$. If it is assumed that the variable capacitors $C_{41}$-$C_{43}$ are equally as large, $C_{44}$ will then equal $C_{41}/3$, $C_{45}$ will equal $C_{41}$ and $C_{46}$ will equal $C_{41}/3$ in accordance With the example. The negative voltages from the branches 33 and 34 arise because the switches on the variable capacitors $C_{42}$-$C_{43}$ are not switched-over, in the same order in the branches 33 and 34 as in the branch 31.

In the case of a D/A-converter according to FIG. 4, the incremental magnitude of a voltage change dV in branch 31 will be proportional to $dC_{41}/C_{44}$, where $dC_{41}$ signifies the smallest possible change of the capacitance of the capacitor $C_{41}$. In order for the incremental magnitude of a voltage change dV to be of equal value in all branches, the smallest possible capacitance change can be given different values in different branches, so that the capacitance change is adapted to the integration capacitor in the branch concerned. Adaptation of the capacitance change can be made in the logic device controlling the D/A-converter in accordance with an appropriate algorithm. As a further alternative, the integration capacitors $C_{44}$-$C_{46}$ can be made variable instead of the capacitors $C_{41}$-$C_{43}$.

I claim:

1. A method for preventing erroneous echo-elimination and equalization outputs from adaptive echo-elimination and adaptive equalization filters, respectively, caused by digital-to-analog conversion devices and analog-to-digital conversion devices in a telecommunications system, comprising:

(a) generating an error signal based on a difference between a received signal and a detected output signal;

(b) updating said adaptive equalization filter with said error signal; and (c) in at least one of said digital-to-analog conversion devices and said analog-to-digital conversion devices, compensating for non-linearities using said error signal.

2. The method according to claim 1, wherein said updating step further includes:

updating said adaptive echo-elimination filter with said error signal.

3. The method according to claim 2, wherein said compensating step further includes:

generating set point values for said conversion devices based on said error signal, and adjusting said conversion devices based on differences between said set point values and associated sensed values of said devices.

4. A telecommunications system for processing a received signal, comprising:

first filter means for adaptively eliminating echoes in said received signal;

updating means generating an error based on a difference between a received signal and a detected signal for updating said first filter means;

non-linear conversion means for converting the format of said received signal, said conversion means including a plurality of adjustable devices; and logic means for generating a correction signal related to said error signal and adjusting said non-linear conversion means based on said correction signal in order to prevent erroneous filtering.

5. The system as defined in claim 4, further comprising:

second filter means for adaptively equalizing said received signal, wherein said updating means updates said second filter means with said error signal.

6. The system as defined in claim 5, wherein said adjustable devices include:

a plurality of binary-weighted devices wherein one of said binary-weighted devices remains fixed and the remaining binary-weighted devices are adjusted by said logic means.

7. The system as claimed in claim 6, wherein said binary-weighted devices are variable capacitors.

8. The system as defined in claim 6, wherein said binary-weighted devices are current sources.

9. The system as claimed in claim 5, wherein said logic means generates said correction signal based only on a polarity sign of said error signal.

10. The system as defined in claim 4, wherein said conversion means includes a digital-to-analog conversion means.

11. The system as defined in claim 10, wherein said adjustable devices include:
   a plurality of voltage generating means wherein one of said voltage generating means generates a reference voltage and the remaining ones of said voltage generating means output integral multiples of said reference voltage.

12. The system as defined in claim 11, wherein each of said plurality of voltage generating means includes: a variable capacitor means connected in series with an integrator.

13. The telecommunications system as defined in claim 4, wherein said logic means generates set point values for each of said plurality of adjustable devices based on said error signal.

14. The telecommunications system as defined in claim 13, wherein said correction signal is based on differences between said set point values and associated sensed values of said plurality of adjustable devices.

* * * * *